Dec. 15, 1931.  F. H. RAGAN  1,836,726
BRAKE MECHANISM
Filed June 16, 1928
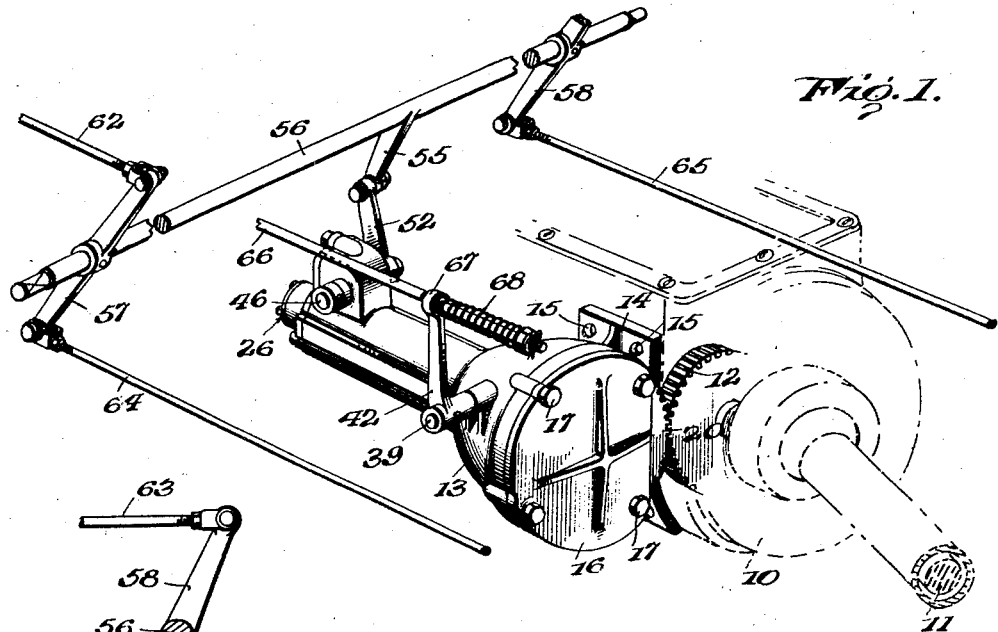
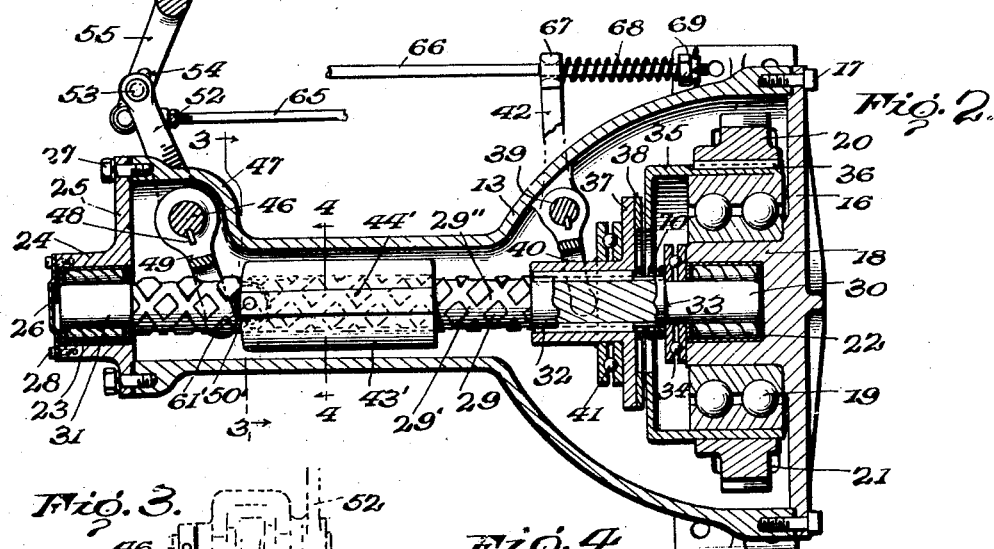
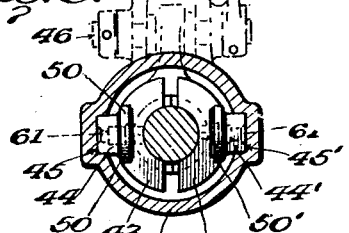
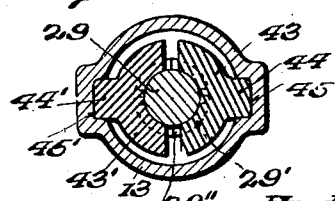
Inventor
Frederick H. Ragan.
By Cameron Kirkam & Sutton
Attorneys Patented Dec. 15, 1931

1,836,726

UNITED STATES PATENT OFFICE

FREDERICK HATHAWAY RAGAN, OF CLEVELAND, OHIO

BRAKE MECHANISM

Application filed June 16, 1928. Serial No. 285,961.

This invention relates to brake operating mechanism for motor vehicles and the like, and more particularly to a power operating mechanism therefor.

Power brake operating mechanisms as heretofore known in the art have been generally heavy and cumbersome and hard to control, and have been subject to rapid wear and deterioration due to the fact that the connections between the source of power and the brake operating means were substantially direct connections and gave the power means little or no mechanical advantage with respect to the brake operating means.

One object of the present invention is to provide a power operated brake mechanism which is strong and reliable and which operates smoothly and efficiently.

Another object is to provide a brake operating mechanism in which the brake applying force is derived from the motion of a rotary part of the vehicle.

Another object is to provide such a device which is capable of accurate control with slight muscular effort on the part of the operator and is continuously under the control of the operator.

Another object is to provide such a device in which the force required to control the application of the brakes is a small fraction of the brake applying force.

Another object of the invention is to provide such a device in which the driving force derived from the rotary part of the vehicle is a small fraction of the brake applying force.

Another object is to provide a brake operating mechanism which operates equally well whether the vehicle is going forward or backward.

Another object of the invention is the provision of a power brake operating mechanism including a force multiplying unit between the driving and controlling means and the brake mechanism, whereby the driving and controlling means may be small and light, and the control will be flexible and accurate.

Another object of the invention is the provision of a power brake operating mechanism including a force multiplying unit, the elements of which are normally stationary, and are in operation only when the brakes are being applied.

Other objects and advantages will be apparent from the following description taken in connection with the disclosure in the accompanying drawings.

The invention is capable of receiving a variety of mechanical expressions, one of which is shown in the accompanying drawings. It is to be expressly understood that the drawings are for purposes of illustration only and are not to be construed as a definition of the limits of the invention, reference being had to the appended claims for that purpose.

In the drawings, wherein the same reference characters are employed to designate corresponding parts in the several figures, Fig. 1 is a perspective view of the brake unit assembled in operative relation with the automobile transmission;

Fig. 2 is a vertical longitudinal section through the power operating unit;

Fig. 3 is a vertical transverse section taken approximately on the line 3—3 of Fig. 2 of the drawings; and Fig. 4 is a vertical transverse section on line 4—4 of Fig. 2.

Referring first to Fig. 1 of the drawings, numeral 10 indicates generally the usual change speed transmission casing of the automobile with a drive shaft 11 extending rearwardly therefrom, and with a gear 12 located in the rear end of the casing in constant driving relation with the drive shaft 11.

An auxiliary housing 13 for the power unit is provided with a flanged bracket 14 fixed to the side of the transmission casing 10 by any suitable means such as the cap screws 15. The housing 13 is enlarged at its rear end to form a substantially hemispherical bell which is closed by a bearing plate 16 fixed thereto by attaching means such as cap screws 17, and having a hollow tubular portion 18 extending within the housing to form a bearing support. An anti-friction radial and thrust bearing 19 is mounted upon the tubular extension 18 and carries a gear 20 freely rotatable on the bearing and with a portion extending through an opening 21 in the side wall of the transmission casing to constantly mesh with the gear 12 in the transmission casing.

An anti-friction bearing 22 is mounted within the tubular extension 18, and a corresponding anti-friction bearing 23 is retained within a tubular extension 24 of the front end plate 25 of the housing 13 by any suitable means such as a cap 26. The end plate 25 is secured to the housing 13, and the cap 26 is secured to the end plate 25 by suitable means such as cap screws 27 and 28 respectively.

A shaft 29 is mounted within the housing and is provided with two sets of oppositely inclined threads 29' and 29'' over the major portion of its length. The ends of the shaft are provided with smooth reduced portions 30 and 31 cooperating with the anti-friction bearings 22 and 23 respectively, and between the threaded portion and the rearward bearing portion 30 there is provided a splined portion 32 terminating in a shoulder 33 adjacent the bearing portion 30. An anti-friction thrust bearing 34 is interposed between the shoulder 33 and the end of the tubular extension 18, to prevent rearward movement of shaft 29.

A friction drum member 35 is keyed to rotate with the gear 20 in any suitable manner as by means of keys 36. A cooperating friction clutch member 37 is slidably keyed on the splined portion 32 of shaft 29 and is provided with a suitable friction facing 38 which is adapted to be brought into operative engagement with the friction member 35. A cross shaft 39 is journaled in the housing above the splined portion 32 of shaft 29 and has keyed thereon a yoke 40 which embraces the clutch member 37 and is adapted to cooperate with an anti-friction thrust bearing 41 mounted on said clutch member. The shaft 39 extends outside of housing 13 and has an operating arm 42 pinned thereon.

Mounted upon the threaded portion of the shaft 29 are two semi-cylindrical nut members 43 and 43' which are oppositely threaded in order that one may cooperate with thread 29' and the other with thread 29'' of the shaft 29. These nut members are provided with longitudinally extending ribs 44 and 44' which engage and slide within longitudinal grooves 45 and 45' of the housing 13 so that the nut members are prevented from rotating with shaft 29, and any rotation of such shaft will cause the nut members to move longitudinally in opposite directions, the nut 43 moving along the threads 29' and the nut 43' along threads 29''.

A cross shaft 46 is journaled in an enlargement 47 at the forward end of housing 13 and has suitably keyed thereon as by means of key 48 a yoke 49 which embraces the shaft 29 and is adapted to engage anti-friction rollers 50 and 50' mounted on the forward end of the nut members 43 and 43' respectively in any suitable manner as by means of pins 61 and 61' respectively. The cross shaft 46 extends outside the housing 13 and has suitably fixed thereon an arm 52 which has an operative engagement, such as a pin and slot connection 53 and 54 with an arm 55 fixed in any suitable way to the usual brake operating cross shaft 56 mounted in the side rails of the chassis (not shown) and connected to operate the brakes of the vehicle in any preferred manner as by means of levers 57 and 58 and links 62, 63, 64 and 65.

A drag link 66 extends rearwardly from the usual brake pedal of the automobile, not shown, and passes through an eye 67 in the upper end of arm 42. A spring 68 is mounted on the rod 66 at the rear of the eye 67, and reacts between the eye 67 and a nut 69 threaded and pinned on the end of rod 66.

The operation of the device is as follows:
Gear 12, being fixed to the drive shaft 11, is rotated by the motion of the vehicle and in turn causes the gear 20 and the friction drum 35 to rotate also. When the operator desires to apply the brakes, he presses forward slightly on the brake pedal which causes the rod 66 to swing arm 42 and yoke 40 to bring the friction clutch member 37 into contact with the friction drum 35. Power is thus transmitted from drum 35 to threaded shaft 29 which causes shaft 29 to rotate and to move the nut members 43 and 43' longitudinally in opposite directions. The nut member 43 or 43' which moves forwardly is forcibly pressed by the threads on the shaft against the yoke 49, causing the latter to swing the shaft 46 and thus to operate the brakes through the arms 52, 55, shaft 56 and links 62—65 inclusive. It will be appreciated that the pressure of the nut member 43 on the yoke 49, although it may be as powerful as desired, depending upon the steepness of the threads of the shaft, still is always under the control of the operator and is completely and accurately controlled by the much lighter engagement between the drum 35 and clutch member 37 through the operation of the brake pedal. When the brake pedal is released by the operator, the clutch member 37 is separated from the drum 35 by the spring 70. The usual brake releasing springs, not shown, then swing the yoke 49 in a counter-clockwise direction, thus sliding the active nut member back to its original central position. This backward movement of the active nut member causes shaft 29 to rotate back to its original position, thus bringing the inactive nut member forward to its central position. If desired, a light spring such as shown at 70 may be interposed between thrust bearing 34 and clutch member 37 in order to maintain a slight clearance between the clutch surfaces when the brakes are not in use.

It will be seen that this structure provides a simple, light and compact device using small clutch elements which may run in oil and which are called upon to handle only small amounts of power and therefore are subject to very slight wear and are in no danger of being burned out through repeated and prolonged application of the brakes. The double-threaded shaft 29 and nut members 43 and 43' enable the multiplication to any desired power of the force transmitted to the clutch member 37 and provide for equally efficient operation of the brake whether the vehicle is proceeding forwardly or rearwardly.

Although this invention has been illustrated in conjuction with a four-wheel braking system, it is equally applicable to an ordinary rear wheel braking system, for instance, by omitting the front wheel brake connections. Furthermore, while the structure shown is the embodiment of the invention which is preferred at this time, it is obvious that other embodiments are possible within the scope of the invention, and it is to be understood that the disclosure is to be considered as illustrative only and not as limiting the invention defined in the appended claims.

What is claimed is:

1. In a brake operating mechanism, a rotatable screw shaft, a friction drum independently journaled coaxially therewith, a gear fixed on said drum and adapted to be continuously driven from a rotating part, a friction clutch member slidably keyed on the shaft adjacent to the drum, a thrust bearing for the shaft preventing motion of the shaft toward the drum, a compression spring between the thrust bearing and the clutch member normally maintaining said clutch members separated, means under the control of the operator for moving the clutch member into engagement with the drum to cause rotation of the shaft, a non-rotatable nut member threaded on the shaft, and connections between the nut member and brakes whereby longitudinal movement of the nut member will actuate the brakes.

2. In a brake operating mechanism for motor vehicles, a power member adapted to be driven from a rotating part of the vehicle, a friction clutch drum mounted coaxially thereof and connected to rotate therewith, a stationary bearing on which said power member is journaled, a shaft rotatably mounted in said bearing coaxially with said clutch drum and provided with a longitudinally shiftable clutch member adapted to cooperate with said clutch drum, said shaft having a thrust element thereon adjacent said bearing, a thrust bearing interposed between said thrust element and said fixed bearing, yielding means mounted on said shaft in cooperative relation with the shiftable clutch member for normally retaining the shiftable clutch member out of engagement with said clutch drum, said yielding means being arranged to bear on said thrust bearing, means under the control of the operator for causing engagement of the clutch member, and connections between the shaft and the vehicle brakes whereby rotation of said shaft will apply the brakes.

In testimony whereof I have signed this specification.

FREDERICK HATHAWAY RAGAN.